US009331749B2

(12) United States Patent
Kuroyama et al.

(10) Patent No.: US 9,331,749 B2
(45) Date of Patent: May 3, 2016

(54) COMMUNICATION SYSTEM, COMMUNICATION APPARATUS, COMMUNICATION METHOD, COMMUNICATION PROGRAM AND ELECTRIC DEVICE

(75) Inventors: Kazuhiro Kuroyama, Osaka (JP); Kazunori Kurimoto, Hyogo (JP); Naofumi Nakatani, Shiga (JP); Yasuo Yoshimura, Shiga (JP); Kenichi Kamon, Shiga (JP); Masaru Yamaoka, Osaka (JP); Toshiaki Ohnishi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 14/343,343

(22) PCT Filed: Feb. 28, 2012

(86) PCT No.: PCT/JP2012/001356
§ 371 (c)(1),
(2), (4) Date: Mar. 6, 2014

(87) PCT Pub. No.: WO2013/035213
PCT Pub. Date: Mar. 14, 2013

(65) Prior Publication Data
US 2014/0227975 A1 Aug. 14, 2014

(30) Foreign Application Priority Data

Sep. 9, 2011 (JP) .................................. 2011-197407

(51) Int. Cl.
*H04B 5/00* (2006.01)
*G08C 17/02* (2006.01)
*H04M 1/725* (2006.01)

(52) U.S. Cl.
CPC .............. *H04B 5/0031* (2013.01); *G08C 17/02* (2013.01); *H04M 1/7253* (2013.01); *G08C 2201/21* (2013.01); *G08C 2201/91* (2013.01); *G08C 2201/93* (2013.01)

(58) Field of Classification Search
CPC ............ H04M 1/7253; G08C 2201/93; H04B 5/0031
USPC ........................................................ 455/41.1
See application file for complete search history.

(56) References Cited

U.S. PATENT DOCUMENTS

| 2005/0096760 | A1 | 5/2005 | Sturm et al. | |
|---|---|---|---|---|
| 2006/0058053 | A1* | 3/2006 | Jatschka | H04W 12/08 455/522 |

(Continued)

FOREIGN PATENT DOCUMENTS

| EP | 2 031 848 A2 | 3/2009 |
|---|---|---|
| EP | 2 352 305 A1 | 8/2011 |

(Continued)

OTHER PUBLICATIONS

International Search Report for International Application No. PCT/JP2012/001356, dated May 15, 2012, 2 pages.

(Continued)

*Primary Examiner* — Eugene Yun
(74) *Attorney, Agent, or Firm* — Brinks Gilson & Lione

(57) ABSTRACT

A first communication unit transmits, to an electrical home appliance, request information that requests electrical home appliance specifying information for specifying the electrical home appliance after an approach instructing screen is displayed on a display unit, and receives response information including at least the electrical home appliance specifying information from the electrical home appliance after the first communication unit and the electrical home appliance have approached each other within a communicable range, and a display control unit switches a display screen to a menu screen that is unique to the electrical home appliance on the basis of the response information received by the first communication unit.

10 Claims, 8 Drawing Sheets

(56) References Cited

U.S. PATENT DOCUMENTS

| | | |
|---|---|---|
| 2006/0089736 A1 | 4/2006 | Kazuta et al. |
| 2007/0092112 A1 | 4/2007 | Awatsu et al. |
| 2009/0131121 A1 | 5/2009 | Ida et al. |
| 2009/0276862 A1 | 11/2009 | Komori et al. |
| 2010/0149196 A1 | 6/2010 | Hattori et al. |
| 2012/0019674 A1 | 1/2012 | Ohnishi et al. |

FOREIGN PATENT DOCUMENTS

| | | |
|---|---|---|
| JP | 08-263705 A | 10/1996 |
| JP | 11-154203 A | 6/1999 |
| JP | 2001-237925 A | 8/2001 |
| JP | 2003-319471 A | 11/2003 |
| JP | 2004-341908 A | 12/2004 |
| JP | 2006-094448 A | 4/2006 |
| JP | 2006-099438 A | 4/2006 |
| JP | 2006-260126 A | 9/2006 |
| JP | 2006-293620 A | 10/2006 |
| JP | 2006-352666 A | 12/2006 |
| JP | 2007-004490 A | 1/2007 |
| JP | 2007-004579 A | 1/2007 |
| JP | 2007-086846 A | 4/2007 |
| JP | 2007-258993 A | 10/2007 |
| JP | 2009-088876 A | 4/2009 |
| JP | 2009-118031 A | 5/2009 |
| JP | 2010-093700 A | 4/2010 |
| JP | 2010-211577 A | 9/2010 |
| JP | 2011-091503 A | 5/2011 |
| WO | WO 2007/116929 A1 | 10/2007 |
| WO | WO 2007/135598 A1 | 11/2007 |
| WO | WO 2011/065028 A1 | 6/2011 |

OTHER PUBLICATIONS

Extended European Search Report in corresponding European Application No. 12829257.0, dated Aug. 21, 2014, 8 pages.

* cited by examiner

TOUCH CORRESPONDING
HOME APPLIANCE

COMMUNICATING
WITH SERVER
PLEASE STAND BY

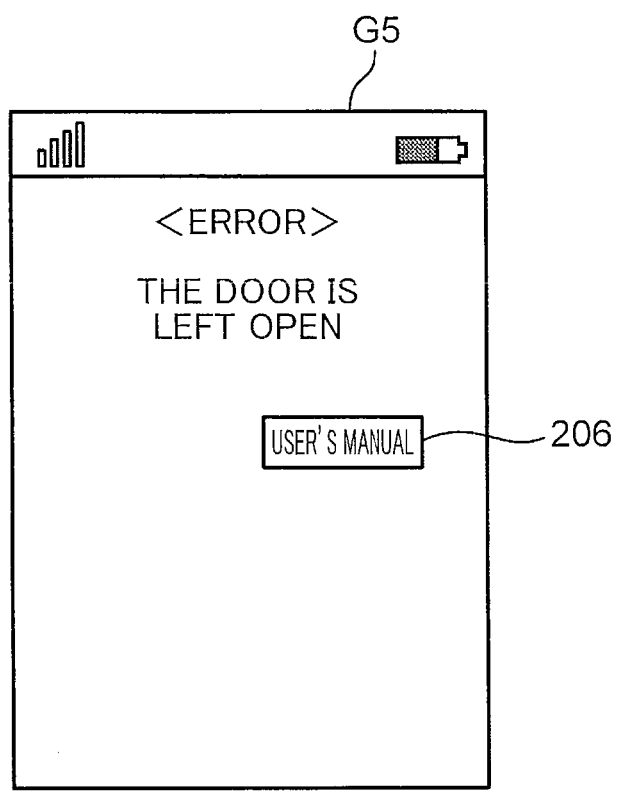

COMMUNICATION SYSTEM, COMMUNICATION APPARATUS, COMMUNICATION METHOD, COMMUNICATION PROGRAM AND ELECTRIC DEVICE

This application is a 371 application of PCT/JP2012/001356 having an international filing date of Feb. 28, 2012, which claims priority to JP2011-197407 Sep. 9, 2011, the entire contents of which are incorporated herein by reference.

TECHNICAL FIELD

The present invention relates to a communication apparatus that communicates with an electric device, a communication method, a communication program, an electric device, and a communication system including the electric device and the communication apparatus.

BACKGROUND ART

Mobile phones have been rapidly spreading in recent years and proposals have been made to use mobile phones as controllers for controlling electrical home appliances.

For example, according to Patent Literature 1, main menu screen data stored in a ROM or the like is read out and a main menu screen that is an initial screen for starting a data communication mode is displayed on a liquid crystal display. Subsequently, as a "remote control information" item is selected from items on the main menu screen, remote control information screen data is received from a server and a remote control information screen presenting names of manufacturers of electrical products in a list format is displayed on the liquid crystal display. When one of the manufacturers' names is selected using a cursor linked to a group of operation input buttons, the mobile phone and a remote control data providing server operated by the manufacturer are connected to each other. Once communication is established, the remote control data providing server sends product list screen data to the mobile phone. Upon receiving the product list screen data, the mobile phone displays a list of names of electrical products in the form of a product list screen. A user selects a name of the electrical product whose remote control specification data the user wants to acquire from the screen. The remote control specification data of the selected electrical product is stored in an internal nonvolatile memory.

In this manner, according to Patent Literature 1, remote control specification data that is necessary for operating a desired electrical product is appropriately acquired from remote control data providing servers of a plurality of manufacturers and stored in a nonvolatile memory. As a result, a mobile phone can be operated as a remote controller.

However, with the mobile phone according to Patent Literature 1 described above, an operation object device must be specified as an initial setting when using the mobile phone as a remote controller. However, specifying an operation object device and displaying a menu screen corresponding to the operation object device requires performing many procedures (steps). In particular, registering a plurality of electric devices as operation object devices in a mobile phone requires a user to perform a significantly large number of input operations. As a result, performing such operations is a hassle.

CITATION LIST

Patent Literature

Patent Literature 1: Japanese Patent Application Laid-open No. 2001-237925

SUMMARY OF THE INVENTION

The present invention has been made in order to solve the problems described above, and an object thereof is to provide a communication system, a communication apparatus, a communication method, a communication program, and an electric device which enable a menu screen unique to the electric device to be readily displayed via the communication apparatus without performing troublesome input operations.

A communication system according to an aspect of the present invention comprises an electric device and a communication apparatus communicably connected to the electric device, wherein: the communication apparatus includes a first communication unit which communicates with the electric device using near-field wireless communication, a display unit which displays an approach instructing screen that instructs a user to cause the first communication unit and the electric device to approach each other so that communication is performed between the first communication unit and the electric device, and a menu screen including at least an item for viewing information related to the electric device or an item for inputting settings of the electric device, and a display control unit which switches a display screen to be displayed on the display unit to either the approach instructing screen or the menu screen; the first communication unit transmits request information that requests electric device specifying information for specifying the electric device to the electric device after the approach instructing screen is displayed on the display unit, and receives response information including at least the electric device specifying information from the electric device after the first communication unit and the electric device have approached each other within a communicable range; the display control unit switches the display screen to the menu screen that is unique to the electric device on the basis of the response information received by the first communication unit; and the electric device includes an electric device specifying information storage unit which stores the electric device specifying information, an electric device communication unit which communicates with the communication apparatus using the near-field wireless communication, and an electric device control unit which reads out the electric device specifying information from the electric device specifying information storage unit and controls the electric device communication unit to transmit response information including the read-out electric device specifying information to the communication apparatus when the request information from the communication apparatus is received by the electric device communication unit.

According to the present invention, since an approach instructing screen that instructs a user to cause a communication apparatus and an electric device to approach each other is displayed on a display unit, communication between the communication apparatus and the electric device is started as the user causes the communication apparatus and the electric device to approach each other according to instructions on the approach instructing screen, and the display screen is switched to a menu screen unique to the electric device on the basis of response information, the menu screen unique to the electric device can be readily displayed via the communication apparatus without performing troublesome input operations.

This and other objects, features, and advantages of the present invention will become more apparent as the following detailed description is read with reference to the accompanying drawings.

BRIEF DESCRIPTION OF THE DRAWINGS

FIG. 10 is a diagram showing an example of an error screen according to the present embodiment.

DESCRIPTION OF EMBODIMENTS

Hereinafter, an embodiment of the present invention will be described with reference to the accompanying drawings. It should be noted that the embodiment described below is merely a concrete example of the present invention and is not intended to limit the technical scope of the present invention.

Figure 1:
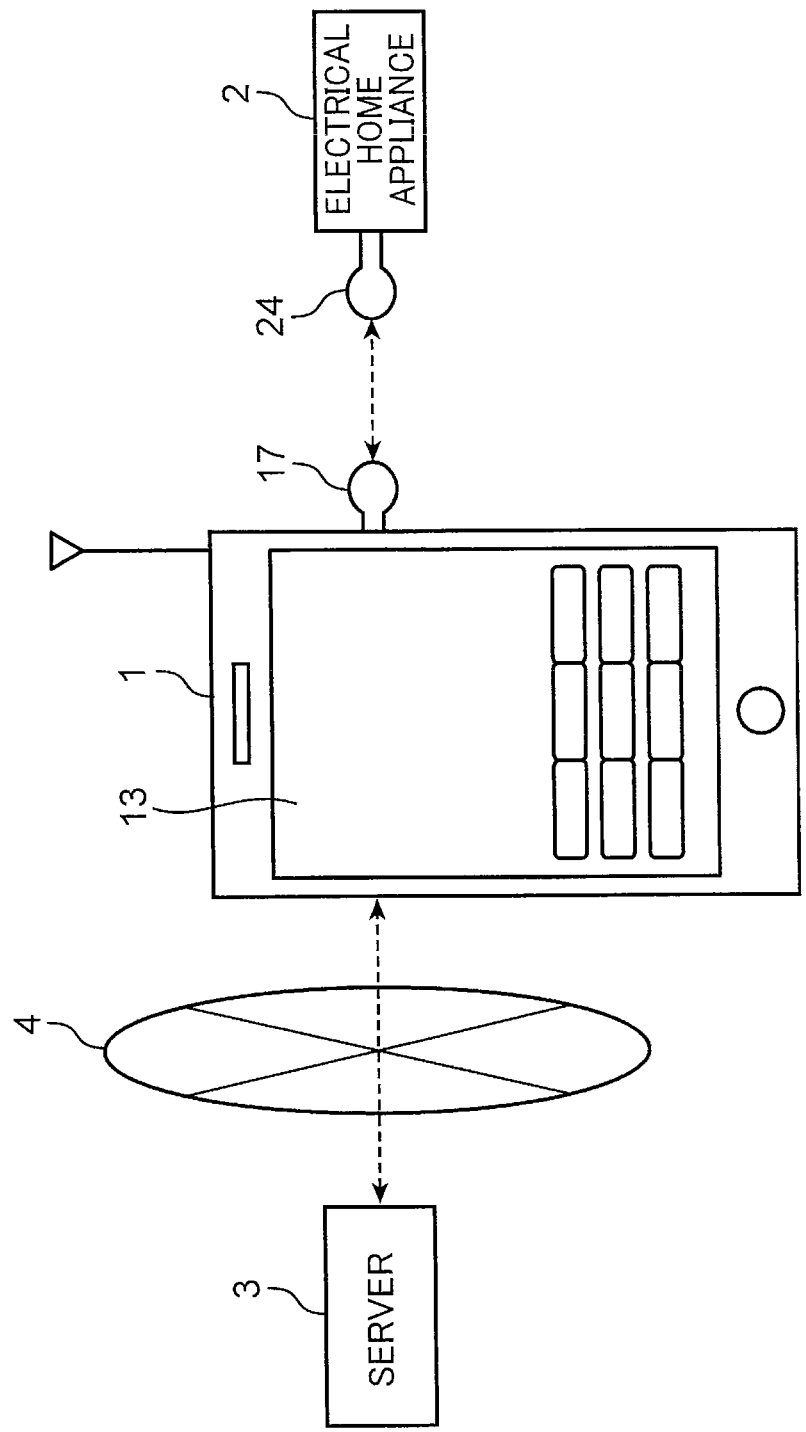
FIG. 1 is a diagram showing an overall configuration of a communication system according to an embodiment of the present invention.

FIG. 1 is a diagram showing an overall configuration of a communication system according to an embodiment of the present invention. The communication system shown in FIG. 1 includes a portable device 1, an electrical home appliance 2, and a server 3.

The portable device 1 is constituted by a communication apparatus such as a mobile phone. The portable device 1 is connected so as to be communicable with the electrical home appliance 2 via a loop antenna 17 using near-field wireless communication and also communicable with the server 3 via a network 4. Although the portable device 1 may be any kind of device as long as the device is provided with a reader/writer that is capable of communicating with an RFID (Radio Frequency IDentification) or NFC (Near Field Communication) of the electrical home appliance 2, the portable device 1 is more favorably portable.

The electrical home appliance 2 is constituted by a television set, a refrigerator, a washing machine, a microwave oven, and the like and is connected so as to be communicable with the portable device 1 using near-field wireless communication. Moreover, the electrical home appliance 2 is an electrical product used in a household including residential equipment and sensors for measuring and sensing residential environment, and may be any kind of electrical device as long as the device is capable of communicating with a reader/writer by passive/active RFID or NFC. The electrical home appliance 2 communicates with the portable device 1 via a loop antenna 24 using near-field wireless communication.

The server 3 is constituted by a known server computer or the like and is connected so as to be communicable with the portable device 1 via the network 4. The server 3 creates menu screen information in accordance with an electrical home appliance that is specified by electrical home appliance specifying information for specifying the electrical home appliance 2. In this case, menu screen information refers to information related to a menu screen including at least an item for viewing information related to the electrical home appliance or an item for inputting settings of the electrical home appliance. In addition, the server 3 receives portable device specifying information for specifying the portable device 1 and electrical home appliance specifying information for specifying the electrical home appliance 2 from the portable device 1 and stores the received portable device specifying information and electrical home appliance specifying information in association with each other.

Figure 2:
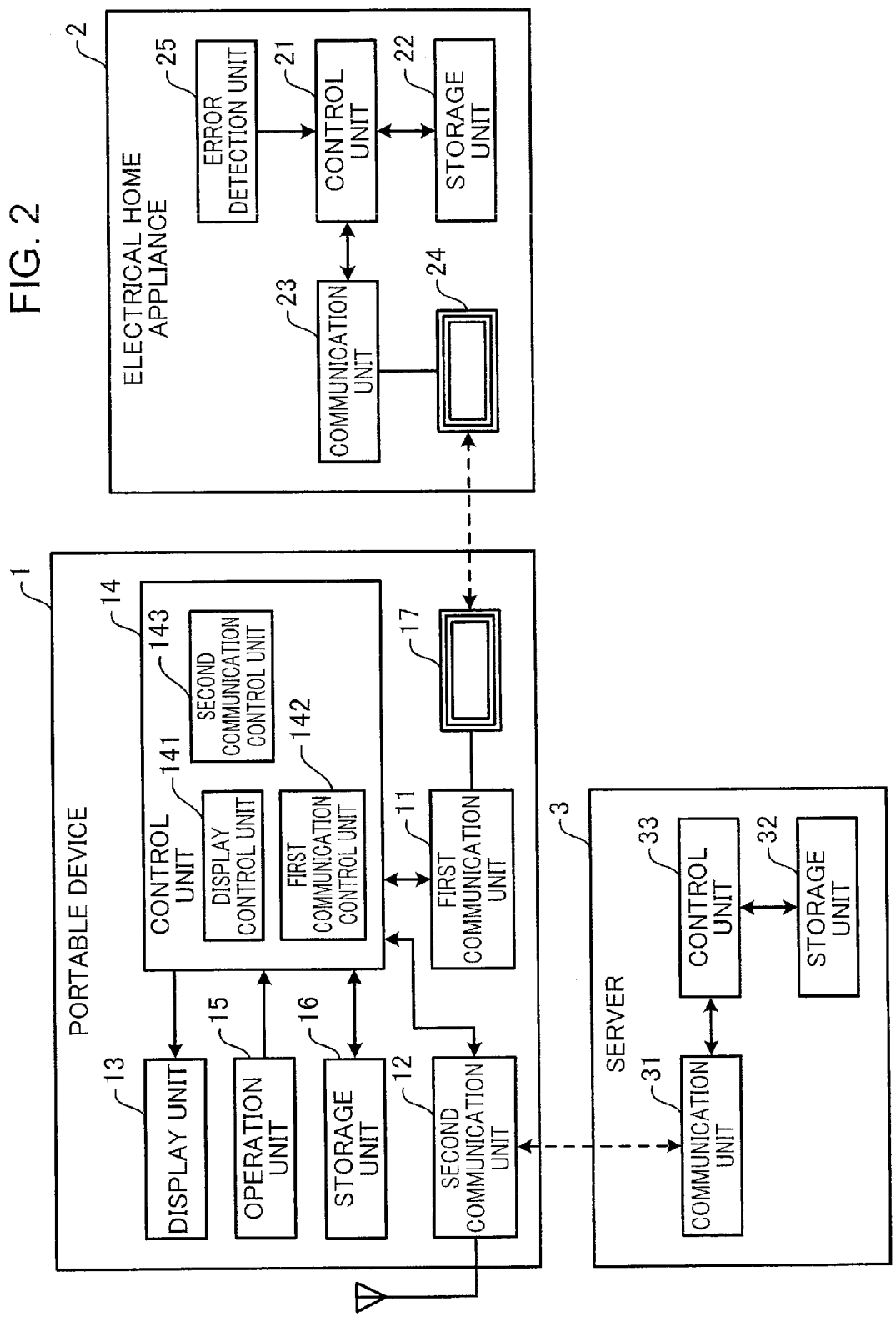
FIG. 2 is a diagram showing a detailed configuration of the communication system according to the embodiment of the present invention.

FIG. 2 is a diagram showing a detailed configuration of the communication system according to the embodiment of the present invention.

The portable device 1 includes a first communication unit 11, a second communication unit 12, a display unit 13, a control unit 14, an operation unit 15, a storage unit 16, and the loop antenna 17.

The first communication unit 11 communicates with the electrical home appliance 2 via the loop antenna 17 using near-field wireless communication.

The loop antenna 17 is an antenna for performing near-field wireless communication. In the present embodiment, although high frequency band RFID or NFC using, for example, the 13.56 MHz band is assumed as the near-field wireless communication, near-field wireless communication is not limited to this frequency band. The frequency band of the near-field wireless communication may be a UHF band ranging from 90 MHz to 1 GHz or a frequency band exceeding 2 GHz.

Near-field wireless communication has a short communication range and requires that loop antennas of two wireless communication devices to engage in communication be brought close to each other. A surface of a wireless communication device on which a loop antenna is mounted is marked with a position of the loop antenna. The user brings the respective marks of the two wireless communication devices close to each other to have the two wireless communication devices perform communication. Since RFID built into a mobile phone does not enable output of the loop antenna to be increased, positioning of the loop antennas must be performed in units of, for example, several mm. Therefore, the respective loop antennas must be brought close to each other in an accurate manner.

The second communication unit 12 communicates with the server using the network 4. Moreover, the network 4 is, for example, a mobile communication network.

The display unit 13 displays an approach instructing screen that instructs the user to cause the first communication unit 11 and the electrical home appliance 2 to approach each other so that communication can be performed between the first communication unit 11 and the electrical home appliance 2 and a menu screen including at least an item for viewing information related to the electrical home appliance 2 or an item for inputting settings of the electrical home appliance 2.

The control unit 14 controls the entire portable device 1 and includes a display control unit 141, a first communication control unit 142, and a second communication control unit 143.

The display control unit 141 switches a display screen to be displayed on the display unit 13 to either the approach instructing screen or the menu screen. The first communication control unit 142 controls the first communication unit 11. The second communication control unit 143 controls the second communication unit 12.

The first communication unit 11 transmits request information that requests electric device specifying information for specifying the electrical home appliance 2 to the electrical home appliance 2 after the approach instructing screen is displayed on the display unit 13. In addition, the first communication unit 11 receives response information including at least the electric device specifying information from the electrical home appliance 2 after the first communication unit 11 and the electrical home appliance 2 have approached each other within a communicable range. Furthermore, the first communication unit 11 starts transmission of the request information to the electrical home appliance 2 in conjunction with the approach instructing screen being displayed on the display unit 13.

The second communication unit 12 transmits response information received by the first communication unit 11 to the server 3. In addition, the second communication unit 12 receives menu screen information for displaying a menu screen unique to the electrical home appliance 2 from the server 3.

The display control unit 141 switches the display screen to the menu screen on the basis of the menu screen information received by the second communication unit 12.

The operation unit 15 is constituted by a touch panel, operation keys, or the like and accepts input operations performed by the user.

The storage unit 16 stores the menu screen information received by the second communication unit 12. When the menu screen information is stored in the storage unit 16, the display control unit 141 switches the display screen to the menu screen on the basis of the menu screen information stored in the storage unit 16 without displaying the approach instructing screen.

The electrical home appliance 2 includes a control unit 21, a storage unit 22, a communication unit 23, the loop antenna 24, and an error detection unit 25.

The control unit 21 is constituted by a CPU (central processing unit) or the like and controls operations of the communication unit 23 and controls operations of the storage unit 22 in accordance with information received via the communication unit 23 and the like.

The storage unit 22 stores, in advance, electrical home appliance specifying information for specifying the electrical home appliance 2 such as a model number, a serial number, or the like of the electrical home appliance 2. Moreover, the electrical home appliance specifying information is stored in advance at the time of manufacture. In addition, the storage unit 22 stores state information such as a use history and error information of the electrical home appliance 2. Moreover, in order to register the electrical home appliance 2 in a database of the server 3, the storage unit 22 favorably includes information that enables a manufacturer of the electrical home appliance 2 to be specified, information that enables a manufacturing date of the electrical home appliance 2 to be specified, information that enables a manufacturing facility of the electrical home appliance 2 to be specified, and the like. In addition, the storage unit 22 favorably includes server specifying information (for example, a URL (Uniform Resource Identifier)) for accessing servers that differ for each manufacturer of the electrical home appliance 2. Accordingly, the server 3 can be readily accessed from the portable device 1. In addition, by retaining a URL in the storage unit 22 of the electrical home appliance 2, the portable device 1 can access a server unique to the electrical home appliance 2 regardless of the device type of the portable device 1.

The communication unit 23 bidirectionally transmits and receives various information to and from the portable device 1 via the loop antenna 24 using near-field wireless communication. The loop antenna 24 is an antenna for performing near-field wireless communication. The communication unit 23 receives request information transmitted by the portable device 1. In addition, the communication unit 23 transmits response information including electrical home appliance specifying information to the portable device 1.

The error detection unit 25 detects errors occurring in the electrical home appliance 2. For example, if the electrical home appliance 2 is a washing machine or a refrigerator, the error detection unit 25 detects that a door has been left open for a certain amount of time. Information regarding an error detected by the error detection unit 25 is outputted to the control unit 21. The control unit 21 stores information regarding the error detected by the error detection unit 25 in the storage unit 22.

When request information from the portable device 1 is received by the communication unit 23, the control unit 21 reads out electrical home appliance specifying information from the storage unit 22, and controls the communication unit 23 so as to transmit response information including the read-out electrical home appliance specifying information to the portable device 1. Alternatively, the control unit 21 may control the communication unit 23 so as to transmit response information further including state information that indicates a state of the electrical home appliance 2 to the portable device 1. In this case, the display unit 13 of the portable device 1 displays a menu screen including an item indicating the state of the electrical home appliance 2.

The server 3 includes a communication unit 31, a storage unit 32, and a control unit 33.

The communication unit 31 communicates with the portable device 1 using the network 4.

The storage unit 32 stores a menu screen to be displayed by the portable device 1 for each product of the electrical home appliance 2. In addition, the storage unit 32 includes a database. The database stores portable device specifying information for specifying the portable device 1 and electrical home appliance specifying information for specifying the electrical home appliance 2 in association with each other.

The control unit 33 is constituted by a CPU or the like and controls operations of the communication unit 31 and controls operations of the storage unit 32 in accordance with information received via the communication unit 31 and the like. When response information from the portable device 1 is received by the communication unit 31, the control unit 33 creates menu screen information in accordance with the electrical home appliance 2 specified by the electrical home appliance specifying information included in the response information and controls the communication unit 31 to transmit the created menu screen information to the portable device 1. The communication unit 31 receives response information transmitted by the portable device 1. In addition, the communication unit 31 transmits the menu screen information created by the control unit 33 to the portable device 1.

The control unit 33 reads out, from the storage unit 32, menu screen information corresponding to the electrical home appliance 2 specified by the electrical home appliance specifying information included in the response information, and controls the communication unit 31 so that the read-out menu screen information is transmitted to the portable device 1. Moreover, when state information of the electrical home appliance 2 is included in the response information, the control unit 33 creates menu screen information including an item that indicates the state of the electrical home appliance 2 based on the state information.

In addition, the control unit 33 associates the portable device specifying information and the electrical home appliance specifying information transmitted by the communication unit 31 with each other and registers the associated information in the database in the storage unit 32. When creating the menu screen information, the control unit 33 determines whether or not the electrical home appliance 2 is registered in the database of the storage unit 32 and creates menu screen information with different display contents depending on whether or not the electrical home appliance 2 is registered.

In the present embodiment, the portable device 1 corresponds to an example of the communication apparatus, the electrical home appliance 2 corresponds to an example of the electric device, the first communication unit 11 corresponds to an example of the first communication unit, the display unit 13 corresponds to an example of the display unit, the display control unit 141 corresponds to an example of the display control unit, the storage unit 22 corresponds to an example of the electric device specifying information storage unit, the communication unit 23 corresponds to an example of the electric device communication unit, the control unit 21 corresponds to an example of the electric device control unit, the server 3 corresponds to an example of the server, the second communication unit 12 corresponds to an example of the second communication unit, the communication unit 31 corresponds to an example of the server communication unit, the control unit 33 corresponds to an example of the server control unit, the storage unit 16 corresponds to an example of the menu screen information storage unit, and the first communication control unit 142 corresponds to an example of the first communication control unit.

Figure 3:
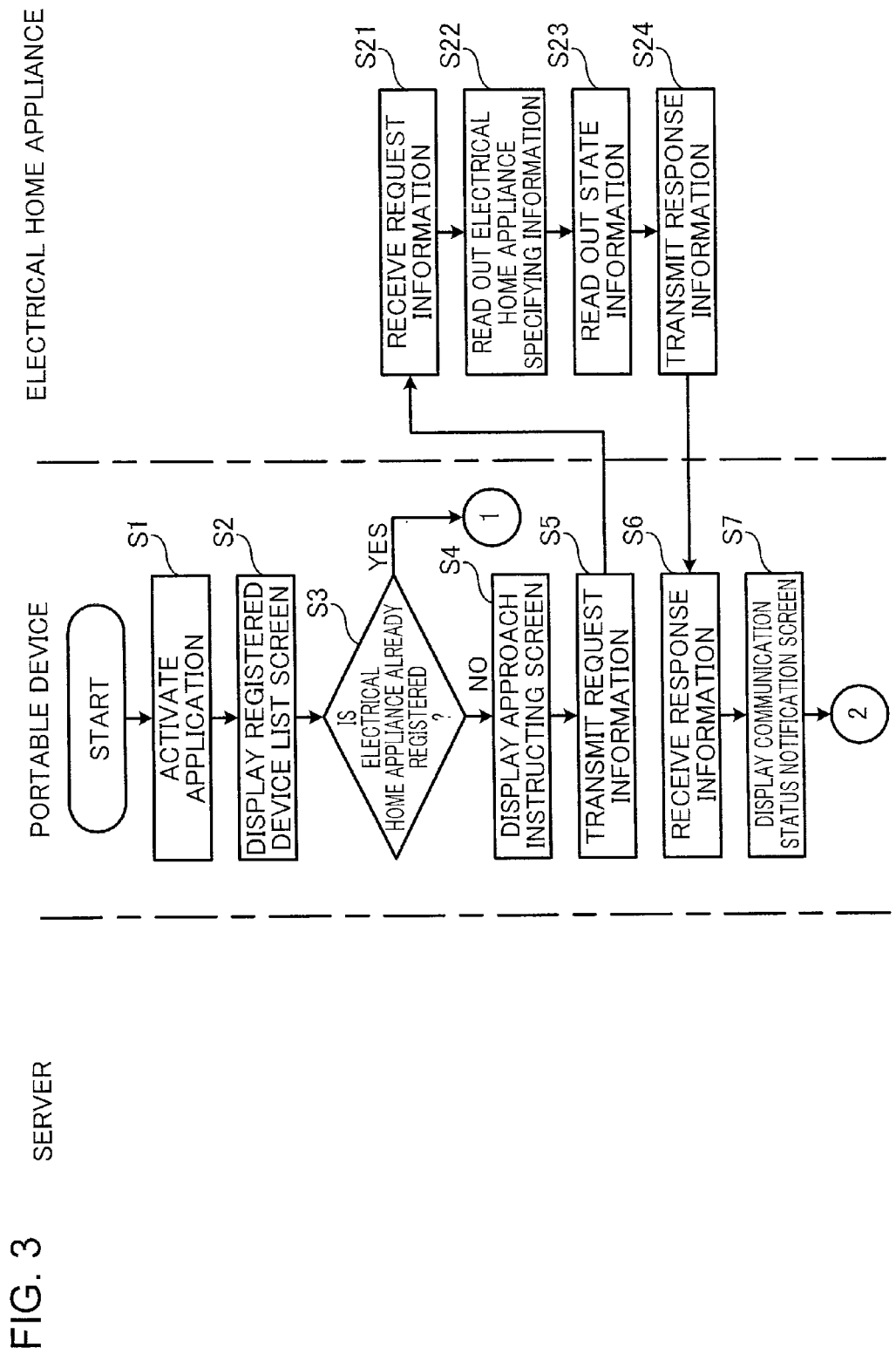
FIG. 3 is a first flow chart for describing operations of the communication system according to the embodiment of the present invention.
Figure 4:
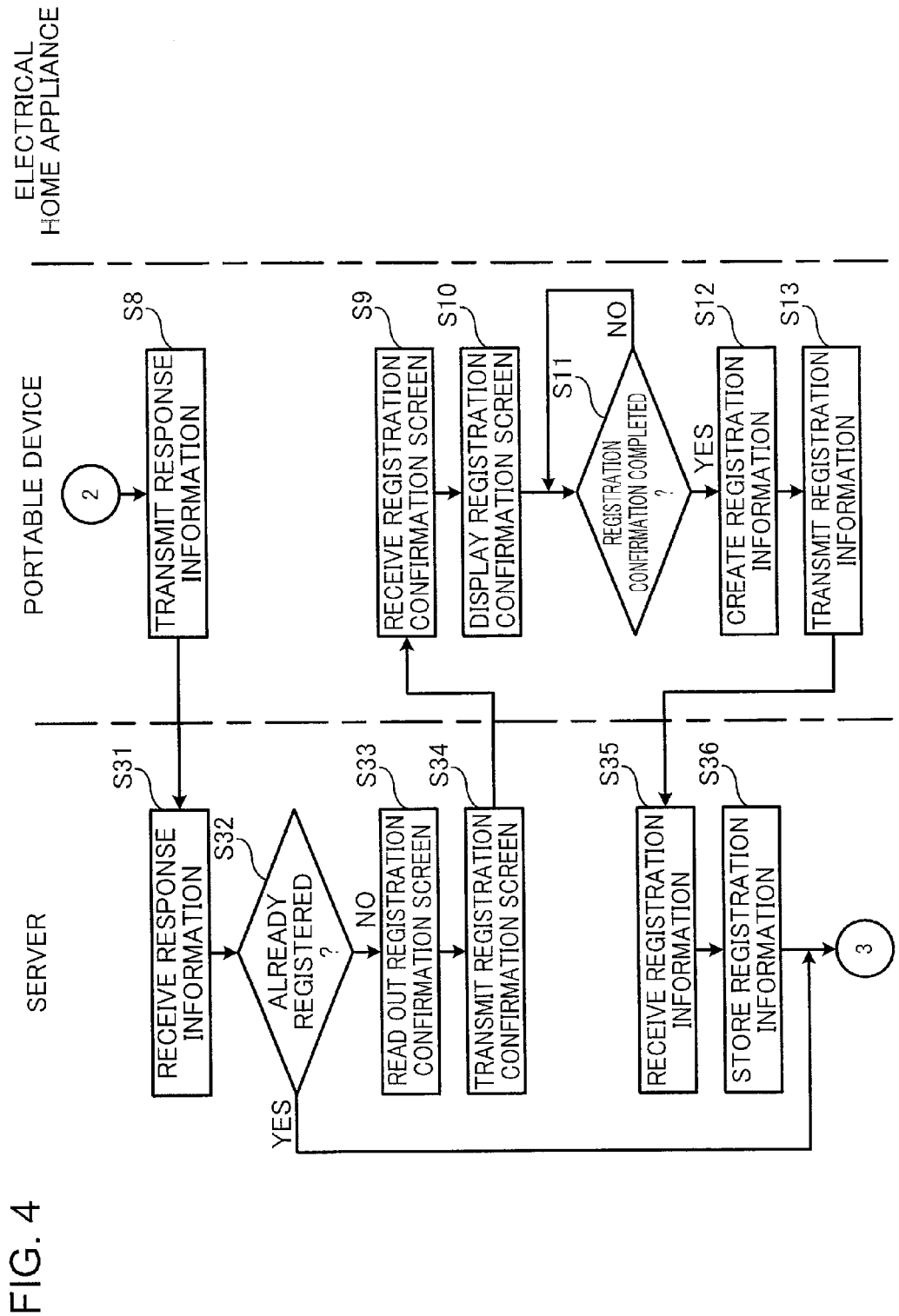
FIG. 4 is a second flow chart for describing operations of the communication system according to the embodiment of the present invention.
Figure 5:
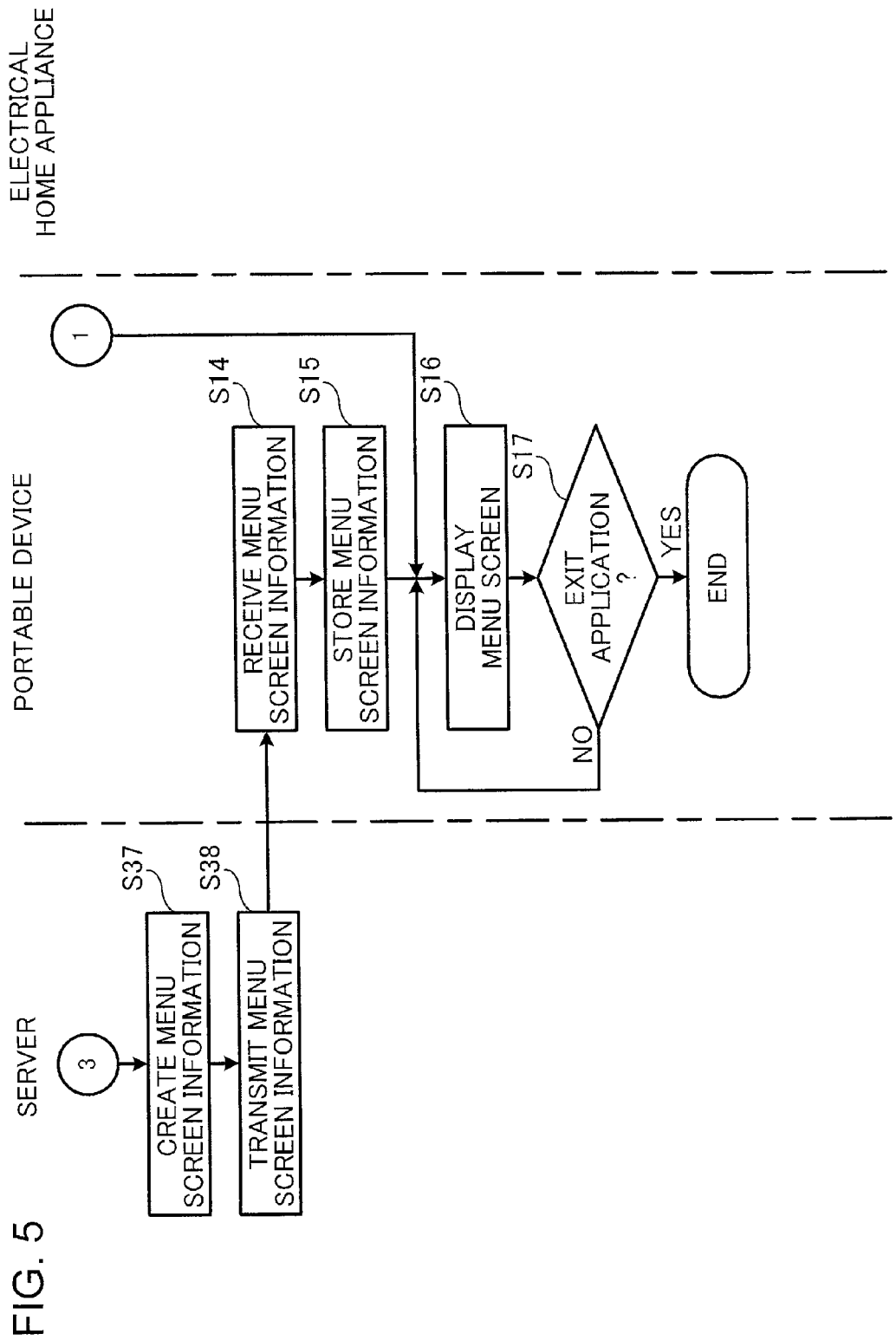
FIG. 5 is a third flow chart for describing operations of the communication system according to the embodiment of the present invention.

Next, operations of the communication system according to the embodiment of the present invention will be described. FIGS. 3 to 5 are flow charts for describing operations of the communication system according to the embodiment of the present invention.

First, in step S1, the control unit 14 of the portable device 1 activates an application for displaying a menu screen for controlling the electrical home appliance 2 on the display unit 13. At this point, the operation unit 15 accepts an activation instruction of the application by the user. The control unit 14 activates the application based on the accepted activation instruction.

Next, in step S2, the display control unit 141 controls the display unit 13 to display a registered device list screen on which a list of electrical home appliances already registered in the server 3 is displayed. The display unit 13 displays the registered device list screen. A list of names of electrical home appliances which are already registered in the server 3 and whose menu screen information is already stored in the storage unit 16 is displayed on the registered device list screen. Moreover, the registered device list screen is stored in the storage unit 16.

Next, in step S3, the display control unit 141 determines whether or not an electrical home appliance for which a menu screen is desirably displayed is registered. At this point, when it is determined that the electrical home appliance for which a menu screen is desirably displayed is already registered or, in other words, when it is determined that the electrical home appliance for which a menu screen is desirably displayed exists on the registered device list screen (YES in step S3), a transition is made to the process of step S16. Moreover, when the electrical home appliance for which a menu screen is desirably displayed exists on the registered device list screen, the user selects the desired electrical home appliance via the operation unit 15.

On the other hand, when it is determined that the electrical home appliance for which a menu screen is desirably displayed is not registered or, in other words, when it is determined that the electrical home appliance for which a menu screen is desirably displayed does not exist on the registered device list screen (NO in step S3), in step S4, the display control unit 141 controls the display unit 13 to display an approach instructing screen that instructs the user to cause the first communication unit 11 and the electrical home appliance 2 to approach each other so that communication can be performed between the first communication unit 11 and the electrical home appliance 2. The display unit 13 displays the approach instructing screen.

Moreover, when the electrical home appliance for which a menu screen is desirably displayed does not exist on the registered device list screen, the user issues an instruction to switch the display screen from the registered device list screen to the approach instructing screen via the operation unit 15. The display control unit 141 switches the display screen from the registered device list screen to the approach instructing screen.

In addition, more specifically, the approach instructing screen is a screen for instructing the user to cause the loop antenna 17 of the portable device 1 and the loop antenna 24 of the electrical home appliance 2 to approach each other. The approach instructing screen is stored in advance in the storage unit 16. The display control unit 141 reads out the approach instructing screen from the storage unit 16 and displays the same.

Figure 6:
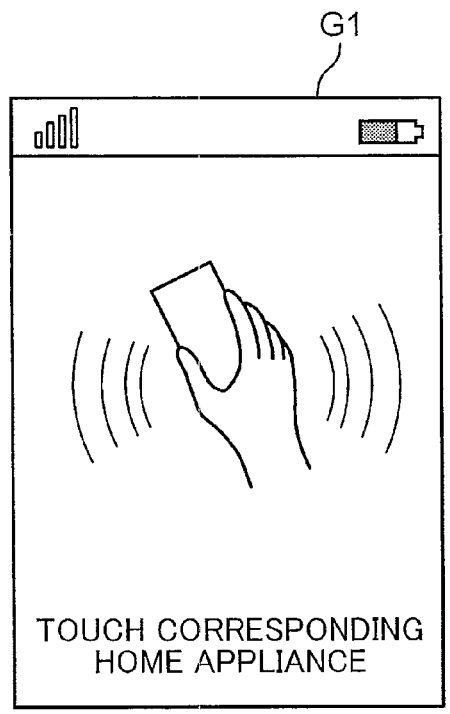
FIG. 6 is a diagram showing an example of an approach instructing screen according to the present embodiment.

FIG. 6 is a diagram showing an example of the approach instructing screen according to the present embodiment.

An approach instructing screen G1 shown in FIG. 6 displays, for example, a message reading "Touch corresponding home appliance". The approach instructing screen G1 is a screen that guides the user to cause the portable device 1 to approach the electrical home appliance 2. When the approach instructing screen G1 is displayed on the display unit 13 of the portable device 1, the user causes the loop antenna 17 of the portable device 1 and the loop antenna 24 of the electrical home appliance 2 to approach each other so that the portable device 1 and the electrical home appliance 2 are within a range that enables communication by near-field wireless communication.

Next, in step S5, after the approach instructing screen is displayed on the display unit 13, the first communication control unit 142 controls the first communication unit 11 to transmit request information that requests electrical home appliance specifying information for specifying the electrical home appliance 2 to the electrical home appliance 2. After the approach instructing screen is displayed on the display unit 13, the first communication unit 11 transmits request information to the electrical home appliance 2. Moreover, the first communication unit 11 starts transmission of the request information to the electrical home appliance 2 in conjunction with the approach instructing screen being displayed on the display unit 13.

Next, in step S21, the communication unit 23 of the electrical home appliance 2 receives the request information transmitted by the first communication unit 11 of the portable device 1.

Next, in step S22, the control unit 21 of the electrical home appliance 2 reads out electrical home appliance specifying information from the storage unit 22.

Next, in step S23, the control unit 21 reads out state information indicating a state of the electrical home appliance 2 from the storage unit 22.

Next, in step S24, the control unit 21 controls the communication unit 23 to transmit response information including the electrical home appliance specifying information and the state information to the portable device 1. The communication unit 23 transmits response information including the electrical home appliance specifying information and the state information to the portable device 1. Moreover, the request information includes address information for specifying the portable device 1. The communication unit 23 transmits the response information to the portable device 1 based on the address information included in the request information.

Next, in step S6, the first communication unit 11 of the portable device 1 receives the response information transmitted by the communication unit 23 of the electrical home appliance 2.

Next, in step S7, the display control unit 141 switches the display screen of the display unit 13 to a communication status notification screen indicating that communication is in progress with the server 3 via the second communication unit 12. Moreover, the communication status notification screen is stored in advance in the storage unit 16. The display control unit 141 reads out the communication status notification screen from the storage unit 16 and displays the same.

Figure 7:
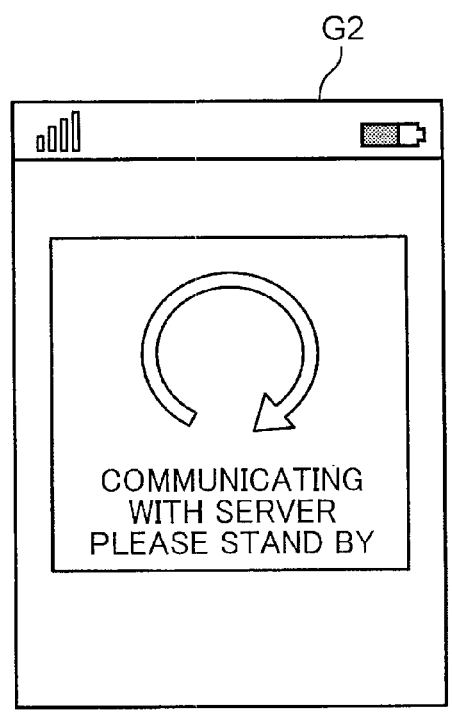
FIG. 7 is a diagram showing an example of a communication status notification screen according to the present embodiment.

FIG. 7 is a diagram showing an example of a communication status notification screen according to the present embodiment.

A communication status notification screen G2 shown in FIG. 7 displays, for example, a message reading "Communicating with server. Please stand by." The communication status notification screen G2 is a screen indicating that the portable device 1 is communicating with the server 3 via the second communication unit 12. The display control unit 141 switches the display screen from the approach instructing screen G1 to the communication status notification screen G2 after the response information is transmitted to the server 3 by the second communication unit 12 until menu screen information is received. Due to the communication status notification screen G2 being displayed, the user can recognize that the portable device 1 and the server 3 are currently communicating with each other and can recognize a current communication status.

Next, in step S8, the second communication control unit 143 controls the second communication unit 12 to transmit the response information received by the first communication unit 11 to the server 3. The second communication unit 12 transmits the response information received by the first communication unit 11 to the server 3. Moreover, the response information transmitted by the electrical home appliance 2 includes address information for specifying the server 3. The second communication unit 12 transmits the response information to the server 3 based on the address information included in the response information.

Although the response information transmitted by the electrical home appliance 2 includes address information for specifying the server 3 according to the present embodiment, the present invention is not limited thereto. Alternatively, address information for specifying the server 3 may be stored in the portable device 1.

Next, in step S31, the communication unit 31 of the server 3 receives the response information transmitted by the second communication unit 12 of the portable device 1.

Next, in step S32, the control unit 33 determines whether or not the electrical home appliance specifying information included in the response information is registered in the database of the storage unit 32. At this point, when it is determined that the electrical home appliance specifying information is registered in the database of the storage unit 32 (YES in step S32), a transition is made to the process of step S37.

On the other hand, when it is determined that the electrical home appliance specifying information is not registered in the database of the storage unit 32 (NO in step S32), in step S33, the control unit 33 reads out a registration confirmation screen for confirming with the user as to whether the electrical home appliance 2 is to be registered in the server 3 from the storage unit 32. Moreover, the registration confirmation screen is stored in advance in the storage unit 32. The display control unit 33 reads out the registration confirmation screen from the storage unit 32.

Next, in step S34, the communication unit 31 transmits the registration confirmation screen to the portable device 1.

Next, in step S9, the second communication unit 12 of the portable device 1 receives the registration confirmation screen transmitted by the communication unit 31 of the server 3.

Next, in step S10, the display control unit 141 controls the display unit 13 to display the registration confirmation screen received by the second communication unit 12. The display unit 13 displays the registration confirmation screen received by the second communication unit 12. The registration confirmation screen displays a message for confirming with the user as to whether the electrical home appliance 2 is to be registered in the server 3 such as "Do you wish to perform user registration?"

Next, in step S11, the control unit 14 determines whether or not registration confirmation has been completed. At this point, the operation unit 15 accepts a registration instruction by the user. The control unit 14 determines whether or not registration confirmation has been completed based on the accepted registration instruction. At this point, when it is determined that registration confirmation has not been completed (NO in step S11), the determination process of step S11 is performed until the registration confirmation is completed.

On the other hand, when it is determined that registration confirmation has been completed (YES in step S11), in step S12, the control unit 14 creates registration information associating electrical home appliance specifying information included in the response information received by the first communication unit 11 and portable device specifying information stored in the storage unit 16 with each other. Moreover, the control unit 14 may create registration information that associates an e-mail address of the portable device 1, a telephone number of the portable device 1, a name of an owner of the portable device 1, a name of a user using the electrical home appliance 2, an e-mail address of the user, a telephone number of the user, an address of the user, a subscriber number stored in an SIM (Subscriber Identity Module) card, or the like in addition to portable device specifying information with electrical home appliance specifying information.

Next, in step S13, the second communication control unit 143 controls the second communication unit 12 to transmit the created registration information to the server 3. The second communication unit 12 transmits the created registration information to the server 3.

Next, in step S35, the communication unit 31 of the server 3 receives the registration information transmitted by the second communication unit 12 of the portable device 1.

Next, in step S36, the control unit 33 registers the registration information transmitted by the portable device 1 in the database of the storage unit 32. The database included in the server 3 stores electrical home appliance specifying information associated with portable device specifying information. The portable device specifying information is used as information specifying a user. Therefore, the database manages a list of electrical home appliances owned by a user.

Alternatively, the control unit 33 may register a user ID for identifying a user in the database of the storage unit 32 in association with electrical home appliance specifying information. A user ID is assigned to each user. The control unit 33 determines whether or not a user ID is already registered based on registration information transmitted from the portable device 1. When a user ID is not registered, the control unit 33 newly assigns a user ID, associates the user ID with electrical home appliance specifying information, and stores the associated user ID. On the other hand, when a user ID is already registered, the control unit 33 associates the user ID with electrical home appliance specifying information, and stores the associated user ID. Moreover, when a user ID is already assigned, the portable device 1 may create registration information in which the user ID and electrical home appliance specifying information are associated with each other and transmit the created registration information to the server 3.

Furthermore, the control unit 33 may associate a user ID with personal information of a user such as a name of the user, an e-mail address of the user, a telephone number of the user, and an address of the user, and register the associated user ID in the database of the storage unit 32. By associating a user ID and personal information of the user with each other, various information of the electrical home appliance 2 other than error information or, in other words, information such as information notifying periodic maintenance, a message celebrating a birthday of a registrant, information provided to a registrant based on the number of days from a registration date of an electrical home appliance, and the like can be displayed on a menu screen. Examples of information provided to a registrant based on the number of days from a registration date of an electrical home appliance include information providing a replacement timing of a filter of an air conditioner.

Moreover, while the electrical home appliance 2 is registered in the server 3 in the present embodiment, the present invention is not limited thereto and the electrical home appliance 2 may not be registered in the server 3. In this case, processes of steps S32 to S36 and processes of steps S9 to S13 are omitted.

In addition, when accepting a selection made by a user regarding whether or not the electrical home appliance 2 is to be registered in the server 3 and the user selects not to register the electrical home appliance 2 in the server 3, the process may be terminated without displaying a menu screen.

In addition, when accepting a selection made by a user regarding whether or not the electrical home appliance 2 is to be registered in the server 3 and the user selects not to register the electrical home appliance 2 in the server 3, items displayed on the menu screen may be limited. For example, when the electrical home appliance 2 is not registered in the server 3, the display unit 13 only displays items for viewing information related to the electrical home appliance 2 on the menu screen and does not display items for inputting settings of the electrical home appliance 2.

Next, in step S37, the control unit 33 creates menu screen information in accordance with the electrical home appliance 2 specified by the electrical home appliance specifying information included in the response information. At this point, the control unit 33 reads out a menu screen corresponding to the electrical home appliance 2 specified by the electrical home appliance specifying information from the storage unit 32 and creates menu screen information including state information of the electrical home appliance 2 included in the response information.

Next, in step S38, the communication unit 31 transmits menu screen information for displaying a menu screen unique to the electrical home appliance 2 to the portable device 1.

Next, in step S14, the second communication unit 12 of the portable device 1 receives the menu screen information transmitted by the communication unit 31 of the server 3.

Next, in step S15, the display control unit 141 stores the menu screen information received by the second communication unit 12 in the storage unit 16. At this point, the display control unit 141 updates the registered device list screen stored in the storage unit 16 in order to display the electrical home appliances registered in the server 3 or, in other words, the electrical home appliances whose menu screen information is stored in the storage unit 16 on the registered device list screen.

Moreover, while the storage unit 16 stores received menu screen information in the present embodiment, the present invention is not limited thereto and the storage unit 16 may not store received menu screen information. When the storage unit 16 does not store menu screen information, the process of storing menu screen information in step S15 is omitted.

In addition, the storage unit 16 stores menu screen information in association with electrical home appliance specifying information. When menu screen information is already stored, the menu screen information is updated to the received menu screen information.

Next, in step S16, the display control unit 141 switches the display screen to a menu screen on the basis of the menu screen information received by the second communication unit 12. The display unit 13 displays a menu screen based on the menu screen information received by the second communication unit 12. Moreover, when it is determined that the electrical home appliance for which a menu screen is desirably displayed is already registered (YES in step S3), in step S16, the display control unit 141 switches the display screen to a menu screen on the basis of the menu screen information stored in the storage unit 16.

While the menu screen is being displayed, the operation unit 15 accepts a selection by the user of an item displayed on the menu screen. As a result, a screen corresponding to the selected item is displayed and control of the electrical home appliance 2 corresponding to the selected item is performed.

Figure 8:
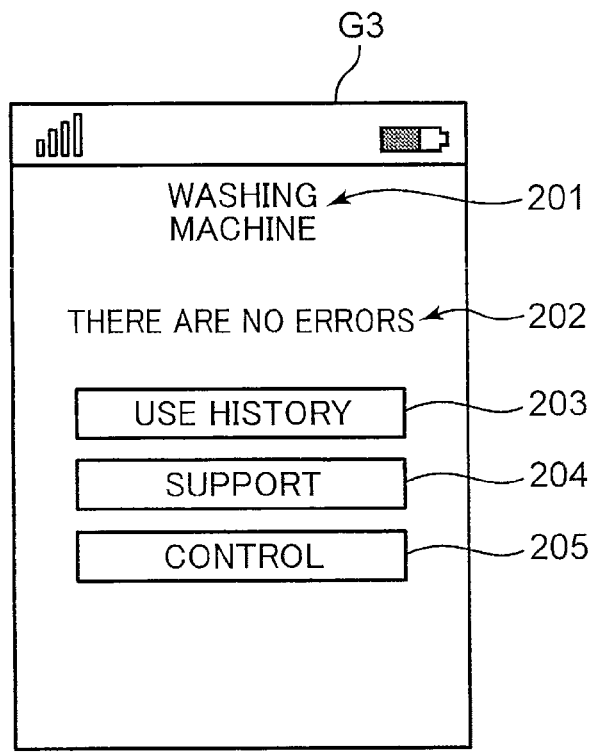
FIG. 8 is a diagram showing an example of a menu screen when an electrical home appliance does not have any errors according to the present embodiment.
Figure 9:
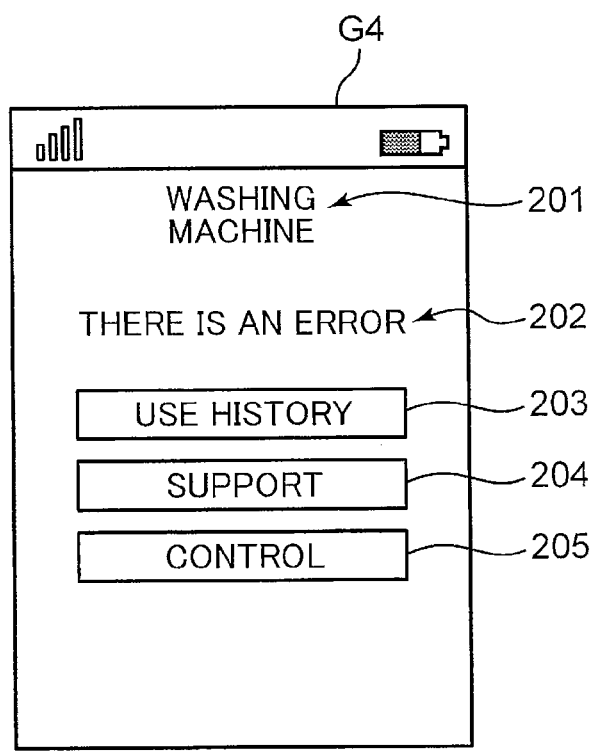
FIG. 9 is a diagram showing an example of a menu screen when an electrical home appliance has an error according to the present embodiment.

FIG. 8 is a diagram showing an example of a menu screen when an electrical home appliance does not have any errors according to the present embodiment, FIG. 9 is a diagram showing an example of a menu screen when an electrical home appliance has an error according to the present embodiment, and FIG. 10 is a diagram showing an example of an error screen according to the present embodiment.

Menu screens G3 and G4 shown in FIGS. 8 and 9 display a type name 201 representing a type of the electrical home appliance 2, state information 202 representing a state of the electrical home appliance 2, a use history display button 203 for displaying a use history of the electrical home appliance 2, a support information display button 204 for displaying support information of the electrical home appliance 2, and a control display button 205 for controlling operations of the electrical home appliance 2. The menu screen G3 shown in FIG. 8 is a menu screen in a case where the electrical home appliance 2 does not have any errors, and the menu screen G4 shown in FIG. 9 is a menu screen in a case where the electrical home appliance 2 has an error.

As shown in FIG. 8, for example, when the electrical home appliance 2 is a washing machine and no errors are detected in the washing machine, characters reading "washing machine" is displayed as the type name 201 and a message reading "There are no errors" is displayed as the state information 202 on the menu screen G3. In addition, the use history display button 203, the support information display button 204, and the control display button 205 can be selected via the operation unit 15. When the use history display button 203 is selected, a screen representing a use history of the electrical home appliance 2 is displayed. When the support information display button 204 is selected, a screen representing information for supporting the electrical home appliance 2 is displayed. When the control display button 205 is displayed, a screen for inputting settings of the electrical home appliance 2 is displayed.

As shown in FIG. 9, for example, when the electrical home appliance 2 is a washing machine and an error is detected in the washing machine, a message reading "There is an error" is displayed as the state information 202 on the menu screen G4. At this point, when the support information display button 204 is selected, a support information screen G5 representing support information shown in FIG. 10 is displayed.

On the support information screen G5 shown in FIG. 10, a message reading "The door is left open" is displayed to notify a currently-occurring error to the user. In addition, a user's manual display button 206 for displaying a user's manual of the electrical home appliance 2 is displayed on the support information screen G5. When the user's manual display button 206 is selected, a user's manual screen representing a user's manual of the electrical home appliance 2 is displayed.

Moreover, while screens that are switched due to the use history display button 203, the support information display button 204, the control display button 205, and the user's manual display button 206 being selected are included in menu screen information, the present invention is not limited thereto. Alternatively, the screens may be acquired from the server 3 each time the use history display button 203, the support information display button 204, the control display button 205, and the user's manual display button 206 are selected. In addition, items displayed on the menu screens G3 and G4 are not limited to the items shown in FIGS. 8 and 9, and various items can be displayed.

Next, in step S17, the control unit 14 determines whether or not to exit the application for displaying a menu screen for controlling the electrical home appliance 2 on the display unit 13. At this point, the operation unit 15 accepts an exit instruction of the application by the user. The control unit 14 exits the application based on the accepted exit instruction. At this point, when it is determined that the application is to be exited (YES in step S 17), the process is terminated. On the other hand, when it is determined that the application is not to be exited (NO in step S17), a return is made to the process of step S16 and a menu screen is subsequently displayed.

As described above, an approach instructing screen that instructs a user to cause the portable device 1 and the electrical home appliance 2 to approach each other is displayed, communication between the portable device 1 and the electrical home appliance 2 and communication between the portable device 1 and the server 3 are started as the user causes the portable device 1 and the electrical home appliance 2 to approach each other per the instructions on the approach instructing screen, menu screen information for displaying a menu screen unique to the electrical home appliance 2 is received from the server 3, and the display screen is switched to the menu screen on the basis of the menu screen information. Accordingly, the menu screen unique to the electrical home appliance 2 can be readily displayed via the portable device 1 without performing troublesome input operations.

In addition, since the user causes the portable device 1 to approach the electrical home appliance 2, the electrical home appliance 2 can be operated more intuitively as compared to a case where the electrical home appliance 2 is remotely controlled using a remote controller from a position separated from the electrical home appliance 2.

Moreover, while the communication system includes the server 3 in the present embodiment, the present invention is not limited thereto. Alternatively, functions of the server 3 may be included in the portable device 1. Specifically, the communication system includes the electrical home appliance 2 and the portable device 1 that is communicably connected to the electrical home appliance 2, and the display control unit 141 switches a display screen to a menu screen unique to the electrical home appliance 2 on the basis of response information received by the first communication unit 11. In this case, the storage unit 16 of the portable device 1 stores menu screen information for displaying the menu screen unique to the electrical home appliance 2 in association with electrical home appliance specifying information. The display control unit 141 reads out menu screen information corresponding to the electrical home appliance specifying information included in the response information received by the first communication unit 11 from the storage unit 16 and switches the display screen to the menu screen on the basis of the read-out menu screen information.

The specific embodiment described above primarily includes an invention configured as described below.

A communication system according to an aspect of the present invention comprises an electric device and a communication apparatus communicably connected to the electric device, wherein: the communication apparatus includes a first communication unit which communicates with the electric device using near-field wireless communication, a display unit which displays an approach instructing screen that instructs a user to cause the first communication unit and the electric device to approach each other so that communication is performed between the first communication unit and the electric device, and a menu screen including at least an item for viewing information related to the electric device or an item for inputting settings of the electric device, and a display control unit which switches a display screen to be displayed on the display unit to either the approach instructing screen or the menu screen; the first communication unit transmits request information that requests electric device specifying information for specifying the electric device to the electric device after the approach instructing screen is displayed on the display unit, and receives response information including at least the electric device specifying information from the electric device after the first communication unit and the electric device have approached each other within a communicable range; the display control unit switches the display screen to the menu screen that is unique to the electric device on the basis of the response information received by the first communication unit; and the electric device includes an electric device specifying information storage unit which stores the electric device specifying information, an electric device communication unit which communicates with the communication apparatus using the near-field wireless communication, and an electric device control unit which reads out the electric device specifying information from the electric device specifying information storage unit and controls the electric device communication unit to transmit response information including the read-out electric device specifying information to the communication apparatus when the request information from the communication apparatus is received by the electric device communication unit.

According to this configuration, the first communication unit of the communication apparatus communicates with the electric device using near-field wireless communication. The display unit of the communication apparatus displays an approach instructing screen that instructs the user to cause the first communication unit and the electric device to approach each other so that communication is performed between the first communication unit and the electric device, and a menu screen including at least an item for viewing information related to the electric device or an item for inputting settings of the electric device. The display control unit of the communication apparatus switches a display screen to be displayed on the display unit to either the approach instructing screen or the menu screen. After the approach instructing screen is displayed on the display unit, the first communication unit transmits request information that requests electric device specifying information for specifying the electric device to the electric device, and after the first communication unit and the electric device have approached each other within a communicable range, the first communication unit receives response information including at least electric device specifying information from the electric device. The display control unit switches the display screen to a menu screen unique to the electric device on the basis of the response information received by the first communication unit. In addition, the electric device specifying information storage unit of the electric device stores electric device specifying information. The electric device communication unit of the electric device communicates with the communication apparatus using near-field wireless communication. When request information from the communication apparatus is received by the electric device communication unit, the electric device control unit of the electric device reads out electric device specifying information from the electric device specifying information storage unit and controls the electric device communication unit to transmit response information including the read-out electric device specifying information to the communication apparatus.

Therefore, since an approach instructing screen that instructs a user to cause a communication apparatus and an electric device to approach each other is displayed on a display unit, communication between the communication apparatus and the electric device is started as the user causes the communication apparatus and the electric device to approach each other according to instructions on the approach instructing screen, and the display screen is switched to a menu screen unique to the electric device on the basis of response information, the menu screen unique to the electric device can be readily displayed via the communication apparatus without performing troublesome input operations.

In addition, in the communication system described above, favorably, the first communication unit starts transmission of the request information to the electric device in conjunction with the approach instructing screen being displayed on the display unit.

According to this configuration, since transmission of the request information to the electric device is started in conjunction with the approach instructing screen being displayed on the display unit, the user need not instruct transmission of the request information, and communication between the communication apparatus and the electric device can be started by causing the communication apparatus and the electric device to approach each other.

Furthermore, in the communication system described above, favorably, the response information includes state information indicating a state of the electric device, the menu screen information includes the state information, and the display unit displays the menu screen including an item indicating the state of the electric device.

According to this configuration, since a menu screen including an item that indicates a state of the electric device is displayed, the state of the electric device can be notified to the user.

In addition, in the communication system described above, favorably, the state information includes error information of the electric device.

According to this configuration, since a menu screen including an item that indicates error information of the electric device is displayed, the error information of the electric device can be notified to the user.

Furthermore, in the communication system described above, favorably, the communication system further includes a server that is communicably connected to the communication apparatus, the communication apparatus further includes a second communication unit that communicates with the server using a network, the second communication unit transmits the response information received by the first communication unit to the server and receives menu screen information for displaying the menu screen unique to the electric device from the server, the display control unit switches the display screen to the menu screen on the basis of the menu screen information received by the second communication unit, and the server includes a server communication unit that communicates with the communication apparatus using a network and a server control unit which, when the response information from the communication apparatus is received by the server communication unit, creates the menu screen information in accordance with an electric device that is specified by the electric device specifying information included in the response information and controls the server communication unit to transmit the created menu screen information to the communication apparatus.

According to this configuration, the second communication unit of the communication apparatus communicates with the server using a network. The second communication unit transmits the response information received by the first communication unit to the server and receives menu screen information for displaying the menu screen unique to the electric device from the server. The display control unit switches the display screen to the menu screen on the basis of the menu screen information received by the second communication unit. In addition, the server communication unit of the server communicates with the communication apparatus using a network. When response information from the communication apparatus is received by the server communication unit, the server control unit of the server creates menu screen information in accordance with the electric device specified by the electric device specifying information included in the response information and controls the server communication unit to transmit the created menu screen information to the communication apparatus.

Therefore, since an approach instructing screen that instructs a user to cause a communication apparatus and an electric device to approach each other is displayed on the display unit, communication between the communication apparatus and the electric device and communication between the communication apparatus and a server are started as the user causes the communication apparatus and the electric device to approach each other according to instructions on the approach instructing screen, menu screen information for displaying a menu screen unique to the electric device is received from the server, and the display screen is switched to the menu screen on the basis of the menu screen information, the menu screen unique to the electric device can be readily displayed via the communication apparatus without performing troublesome input operations. In addition, latest menu screen information can always be acquired from the server.

In addition, in the communication system described above, favorably, display contents of the menu screen differ depending on whether or not the electric device is registered in the server.

According to this configuration, since the display contents of the menu screen differ depending on whether or not the electric device is registered in the server, the user can be prompted to register the electric device in the server by, for example, reducing the number of items displayed on the menu screen when the electric device is not registered in the server as compared to the number of items displayed on the menu screen when the electric device is registered in the server.

Furthermore, in the communication system described above, favorably, the display unit further displays a communication status notification screen indicating that communication is being performed with the server via the second communication unit, and the display control unit switches the display screen to the communication status notification screen after the response information is transmitted to the server by the second communication unit until the menu screen information is received.

According to this configuration, the display unit of the communication apparatus further displays a communication status notification screen indicating that communication is being performed with the server via the second communication unit. In addition, the display control unit switches the display screen to the communication status notification screen after the response information is transmitted to the server by the second communication unit until the menu screen information is received.

Therefore, since the communication status notification screen indicating that communication is being performed with the server is displayed after the response information is transmitted to the server by the second communication unit until the menu screen information is received, the communication status can be notified to the user.

In addition, in the communication system described above, favorably, the communication apparatus further includes a menu screen information storage unit that stores the menu screen information received by the second communication unit, and when the menu screen information is stored in the menu screen information storage unit, the display control unit switches the display screen to the menu screen on the basis of the menu screen information stored in the menu screen information storage unit without displaying the approach instructing screen.

According to this configuration, the menu screen information storage unit of the communication apparatus stores menu screen information received by the second communication unit. In addition, when the menu screen information is stored in the menu screen information storage unit, the display control unit switches the display screen to the menu screen on the basis of the menu screen information stored in the menu screen information storage unit without displaying the approach instructing screen.

Therefore, when the menu screen information is stored in the menu screen information storage unit, since the menu screen is displayed on the basis of the menu screen information stored in the menu screen information storage unit without displaying the approach instructing screen, the time required to display the menu screen can be reduced. In addition, the menu screen can be displayed without having to cause the communication apparatus and the electric device to approach each other.

A communication apparatus according to another aspect of the present invention comprises: a first communication unit which communicates with an electric device using near-field wireless communication; a display unit which displays an approach instructing screen that instructs a user to cause the first communication unit and the electric device to approach each other so that communication is performed between the first communication unit and the electric device, and a menu screen including at least an item for viewing information related to the electric device or an item for inputting settings of the electric device; and a display control unit which switches a display screen to be displayed on the display unit to either the approach instructing screen or the menu screen, wherein the first communication unit transmits request information that requests electric device specifying information for specifying the electric device to the electric device after the approach instructing screen is displayed on the display unit, and receives response information including at least the electric device specifying information from the electric device after the first communication unit and the electric device have approached each other within a communicable range, and the display control unit switches the display screen to the menu screen that is unique to the electric device on the basis of the response information received by the first communication unit.

According to this configuration, the first communication unit communicates with the electric device using near-field wireless communication. The display unit displays an approach instructing screen that instructs the user to cause the first communication unit and the electric device to approach each other so that communication is performed between the first communication unit and the electric device, and a menu screen including at least an item for viewing information related to the electric device or an item for inputting settings of the electric device. The display control unit switches a display screen to be displayed on the display unit to either the approach instructing screen or the menu screen. In addition, after the approach instructing screen is displayed on the display unit, the first communication unit transmits request information that requests electric device specifying information for specifying the electric device to the electric device, and after the first communication unit and the electric device have approached each other within a communicable range, the first communication unit receives response information including at least electric device specifying information from the electric device. The display control unit switches the display screen to a menu screen unique to the electric device on the basis of the response information received by the first communication unit.

Therefore, since an approach instructing screen that instructs the user to cause a communication apparatus and an electric device to approach each other is displayed on a display unit, communication between the communication apparatus and the electric device is started as the user causes the communication apparatus and the electric device to approach each other according to instructions on the approach instructing screen, and the display screen is switched to a menu screen unique to the electric device on the basis of response information, the menu screen unique to the electric device can be readily displayed via the communication apparatus without performing troublesome input operations.

A communication method according to another aspect of the present invention comprises: an approach instructing screen displaying step of displaying, on a display unit, an approach instructing screen which instructs a user to cause a first communication unit that communicates with an electric device using near-field wireless communication and the electric device to approach each other so that communication is performed between the first communication unit and the electric device; a request information transmitting step of having the first communication unit transmit request information that requests electric device specifying information for specifying the electric device to the electric device after the approach instructing screen is displayed on the display unit; a response information receiving step of having the first communication unit receive response information including at least the electric device specifying information from the electric device after the first communication unit and the electric device have approached each other within a communicable range; and a switching step of switching the display screen to the menu screen unique to the electric device which includes at least an item for viewing information related to the electric device or an item for inputting settings of the electric device, on the basis of the response information received in the response information receiving step.

According to this configuration, an approach instructing screen which instructs a user to cause a first communication unit that communicates with an electric device using near-field wireless communication and the electric device to approach each other so that communication is performed between the first communication unit and the electric device is displayed on a display unit. Next, after the approach instructing screen is displayed on the display unit, request information that requests electric device specifying information for specifying the electric device is transmitted by the first communication unit to the electric device. After the first communication unit and the electric device have approached each other within a communicable range, response information including at least the electric device specifying information is received by the first communication unit from the electric device. Next, on the basis of the received response information, the display screen is switched to the menu screen unique to the electric device which includes at least an item for viewing information related to the electric device or an item for inputting settings of the electric device.

Therefore, since an approach instructing screen that instructs a user to cause a communication apparatus and an electric device to approach each other is displayed on a display unit, communication between the communication apparatus and the electric device is started as the user causes the communication apparatus and the electric device to approach each other according to instructions on the approach instructing screen, and the display screen is switched to a menu screen unique to the electric device on the basis of response information, the menu screen unique to the electric device can be readily displayed via the communication apparatus without performing troublesome input operations.

A communication program according to another aspect of the present invention causes a computer to function as: a first communication control unit which controls a first communication unit that communicates with an electric device using near-field wireless communication; and a display control unit which switches a display screen to be displayed on a display unit to either an approach instructing screen that instructs a user to cause the first communication unit and the electric device to approach each other so that communication is performed between the first communication unit and the electric device, and a menu screen including at least an item for viewing information related to the electric device or an item for inputting settings of the electric device, wherein the first communication control unit controls the first communication unit to transmit request information that requests electric device specifying information for specifying the electric device to the electric device after the approach instructing screen is displayed on the display unit, and controls the first communication unit to receive response information including at least the electric device specifying information from the electric device after the first communication unit and the electric device have approached each other within a communicable range, and the display control unit switches the display screen to the menu screen that is unique to the electric device on the basis of the response information received by the first communication unit.

According to this configuration, the first communication control unit controls a first communication unit that communicates with an electric device using near-field wireless communication. The display control unit switches a display screen that is displayed on the display unit to either an approach instructing screen that instructs a user to cause the first communication unit and the electric device to approach each other so that communication is performed between the first communication unit and the electric device, and a menu screen including at least an item for viewing information related to the electric device or an item for inputting settings of the electric device. After the approach instructing screen is displayed on the display unit, the first communication control unit controls the first communication unit to transmit request information that requests electric device specifying information for specifying the electric device to the electric device. In addition, after the first communication unit and the electric device have approached each other within a communicable range, the first communication control unit controls the first communication unit to receive response information including at least the electric device specifying information from the electric device. The display control unit switches the display screen to a menu screen unique to the electric device on the basis of the response information received by the first communication unit.

Therefore, since an approach instructing screen that instructs a user to cause a communication apparatus and an electric device to approach each other is displayed on a display unit, communication between the communication apparatus and the electric device is started as the user causes the communication apparatus and the electric device to approach each other according to instructions on the approach instructing screen, and the display screen is switched to a menu screen unique to the electric device on the basis of response information, the menu screen unique to the electric device can be readily displayed via the communication apparatus without performing troublesome input operations.

An electric device according to another aspect of the present invention comprises: an electric device specifying information storage unit that stores electric device specifying information for specifying the electric device; an electric device communication unit that communicates with a communication apparatus using near-field wireless communication; and an electric device control unit that reads out the electric device specifying information from the electric device specifying information storage unit and controls the electric device communication unit to transmit response information including the read-out electric device specifying information to the communication apparatus when request information from the communication apparatus which requests the electric device specifying information is received by the electric device communication unit after the communication apparatus and the electric device have approached each other within a communicable range.

According to this configuration, the electric device specifying information storage unit stores electric device specifying information for specifying an electric device. The electric device communication unit communicates with the communication apparatus using near-field wireless communication. When request information from the communication apparatus which requests the electric device specifying information is received by the electric device communication unit after the communication apparatus and the electric device have approached each other within a communicable range, the electric device control unit reads out electric device specifying information from the electric device specifying information storage unit and controls the electric device communication unit to transmit response information including the read-out electric device specifying information to the communication apparatus.

Therefore, communication between the communication apparatus and the electric device is started as the user causes the communication apparatus and the electric device to approach each other, and the display screen is switched to a menu screen unique to the electric device on the basis of menu screen information for displaying the menu screen. Accordingly, the menu screen unique to the electric device can be readily displayed via the communication apparatus without performing troublesome input operations.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

Industrial Applicability

The communication system, the communication apparatus, the communication method, the communication program, and the electric device according to the present invention enable a menu screen unique to the electric device to be readily displayed via the communication apparatus without performing troublesome input operations and are useful for a communication apparatus that communicates with an electric device, a communication method, a communication program, an electric device, and a communication system including an electric device and a communication apparatus.

The invention claimed is:

1. A communication method for a portable device comprising:
    displaying, on a display unit, an approach instructing screen that instructs a user to cause a first communication unit and one of a plurality of electric devices to approach each other, the first communication unit communicating with each of the plurality of electric devices using near- field wireless communication, and the one electric device being a communication object among the plurality of electric devices;
    in conjunction with the approach instructing screen being displayed on the display unit, transmitting, by the first communication unit, request information that requests start of near-field wireless communication, to the one electric device that is the communication object;
    receiving, by the first communication unit from the one electric device that is the communication object, response information including at least electric device specifying information for specifying the electric device after the first communication unit and the one electric device that is the communication object become communicable due to the first communication unit approaching the one electric device;
    communicating by the control unit of the portable device, the electric device specifying information, and information that identifies the portable device or information that identifies the user to a server, wherein the server stores data that defines an association between the first communication unit and the portable device to a database, or an association between the first communication unit and the user;
    receiving, by the control unit, menu screen information from the server; and
    displaying, on the display unit, a menu screen based on the menu screen information prepared in accordance with the one electric device that is the communication object, the menu screen including at least one of an item for viewing information related to an electric device specified by the electric device specifying information included in the received response information and an item for inputting settings of the electric device specified by the electric device specifying information.

2. The communication method according to claim 1, wherein
    the menu screen is customized differently for electric devices different than the one electric device that is the communication object.

3. The communication method according to claim 2, further comprising:
    storing, in a storage unit, information for constituting the menu screen to be provided; and
    displaying a screen that is constituted on the basis of the information for constituting the menu screen that is stored in the storage unit, without displaying the first screen, when the information for constituting the menu screen is stored in the storage unit.

4. The communication method according to claim 1, wherein
    the response information further includes state information indicating a state of the electric device, and
    the menu screen includes an item indicating a state of the one electric device that is the communication object based on the state information.

5. The communication method according to claim 4, wherein the state information includes error information of the one electric device that is the communication object.

6. The communication method according to claim 1, further comprising:
    transmitting the electric device specifying information included in the received response information to the server by a second communication unit that communicates with the server via a network; and
    displaying, on the display unit, a communication status notification screen which is a screen to be displayed on the display unit and which indicates that communication is being performed with the server at least after the electric device specifying information is transmitted to the server until the menu screen is displayed on the display unit.

7. A communication apparatus comprising:
- a first communication unit configured to communicate with each of a plurality of electric devices using near-field wireless communication, transmit request information that requests start of communication using near-field wireless communication, to one electric device that is a communication object among the plurality of electric devices, and receive, from the electric device, response information that includes at least electric device specifying information that specifies the one electric device that is the communication object after the first communication unit and the electric device become communicable due to the first communication unit approaching a mark which is provided on the electric device and indicates a position of an antenna;
- a control unit in communication with the first communication unit configured to:
  - communicate the electric device specifying information and information that identifies the communication apparatus or information that identifies the user to a server, wherein the server stores data that defines an association between the first communication unit and the communication apparatus to a database, or an association between the first communication unit and the user; and
  - receive menu screen information from the server; and
- a display unit that displays screens; and
- where the control unit is configured to cause the display unit to display the menu screen in accordance with the one electric device that is the communication object, the menu screen including at least one of an item for viewing information related to the electric device and an item for inputting settings of the electric device, and the electric device being specified by the electric device specifying information included in the response information received by the first communication unit wherein
- the control unit causes the display unit to display an approach instructing screen that instructs a user to cause the first communication unit and one electric device to approach each other, the one electric device being the communication object, and,
- in conjunction with the approach instructing screen being displayed on the display unit, the first communicating unit transmits the request information.

8. The communication apparatus according to claim 7, wherein
- the menu screen is customized differently for electric devices different than the one electric device that is the communication object.

9. A non-transitory computer-readable recording medium on which a computer program is recorded, the computer program causing a communication apparatus including a first communication unit, a display unit and a control unit, and communicating with each of a plurality of electric devices, to function as a communication apparatus which:
- displays, on a display unit, an approach instructing screen that instructs a user to cause a first communication unit and one of a plurality of electric devices to approach each other, the first communication unit communicating with each of the plurality of electric devices using near-field wireless communication, and the one electric device being a communication object among the plurality of electric devices;
- in conjunction with the approach instructing screen being displayed on the display unit, transmits request information that requests start of near-field wireless communication, to the one electric device that is the communication object among the plurality of electric devices;
- receives, from the one electric device that is the communication object, response information including at least electric device specifying information for specifying the electric device after a range between the first communication unit and the one electric device that is the communication object becomes a communicable range due to the first communication unit approaching the one electric device;
- communicate the electric device specifying information and information that identifies the communication apparatus or information that identifies the user to a server, wherein the server stores data that defines an association between the first communication unit and the communication apparatus to a database or an association between the first communication unit and the user; and
- receive menu screen information from the server; and
- displays the menu screen on the display unit in accordance with the one electric device that is the communication object, the menu screen including at least one of an item for viewing information related to an electric device specified by the electric device specifying information included in the received response information and an item for inputting settings of the electric device specified by the electric device specifying information included in the received response information.

10. The non-transitory computer-readable recording medium according to claim 9, wherein
- the menu screen is customized differently for electric devices different than the one electric device that is the communication object.

* * * * *